United States Patent Office 3,141,115
Patented July 14, 1964

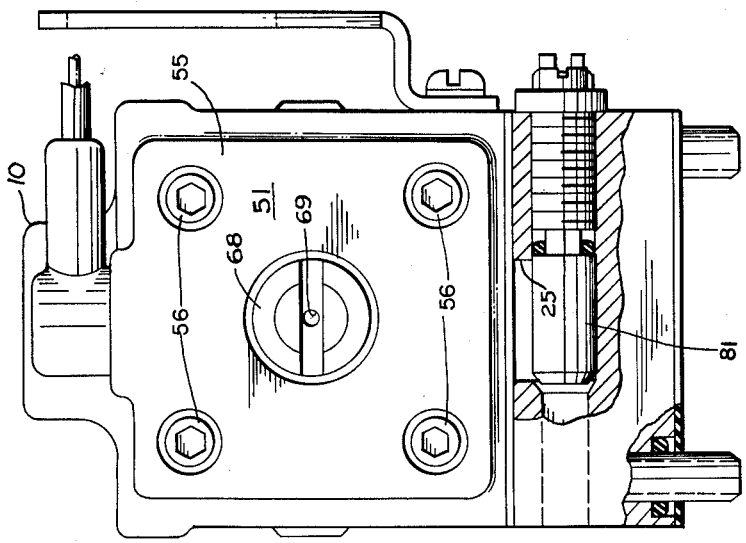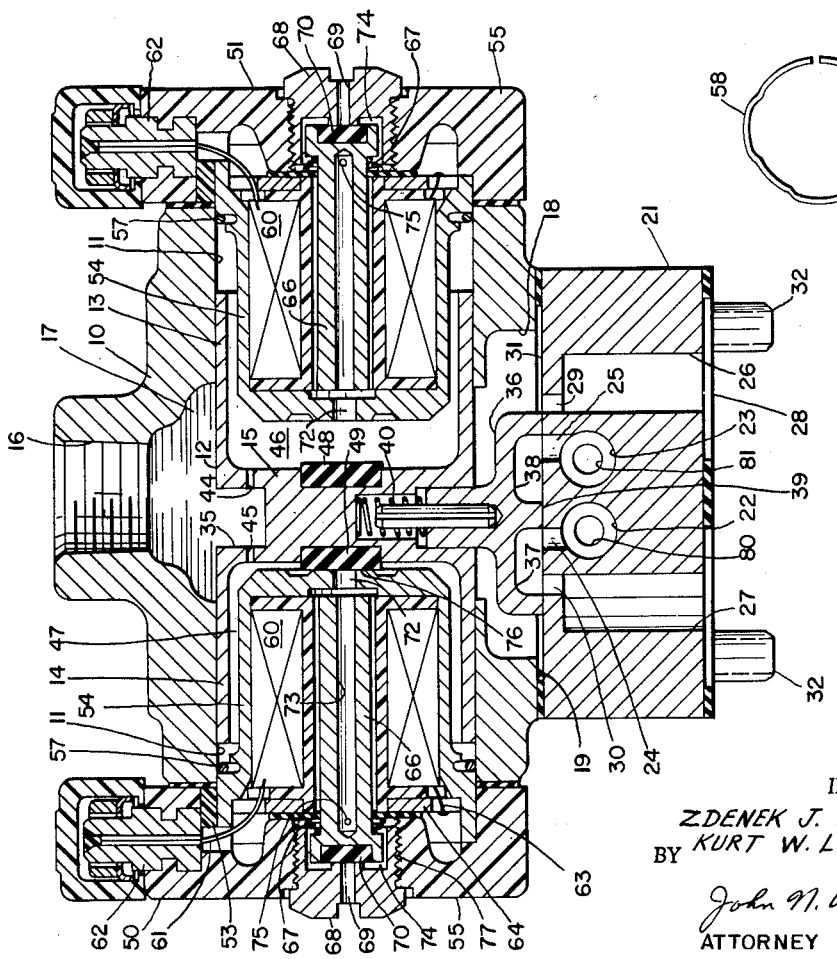

3,141,115
SOLENOID MOUNTING FOR VALVE
OPERATING MECHANISM
Zdenek J. Lansky, North Riverside, and Kurt W. Leibfritz, Norridge, Ill., assignors to Parker-Hannifin Corporation, Cleveland, Ohio, a corporation of Ohio
Filed Jan. 20, 1960, Ser. No. 3,580
9 Claims. (Cl. 317—165)

This invention relates generally to valves and is more particularly concerned with a solenoid valve controlled fluid pressure operated piston for moving a main control valve. The device is especially suited for use in controlling the operation of a fluid power actuated motor.

It is an object of the invention to provide a valve operating mechanism of the type described which is extremely compact in arrangement.

It is another object to provide such a device in which a pair of solenoid operated pilot valves are arranged in axial alignment with and on opposite sides of a reciprocating piston which operates a main valve and in which an auxiliary valve action is provided between the piston and solenoid valve housings to minimize loss of pressure fluid used for reciprocating the piston.

It is another object to provide a novel form of solenoid in which the valve plunger may be readily removed for servicing.

It is another object to provide a novel form of solenoid valve for use in connection with a valve operating mechanism of the type described in which an exhaust passage through the solenoid valve is in axial alignment therewith and includes an axial passage in the solenoid valve plunger.

It is another object to provide a valve operating mechanism of the type described in which a novel means is provided for grounding the solenoid housings with respect to the main housing for the device.

It is another object to provide a simplified construction for the mechanism in which the solenoid terminals are mounted in a plastic member which serves to insulate the terminal from the main housing and also serves as a cap for mounting the solenoid to the main housing.

Other objects will be apparent from the following description and from the drawings in which:

FIG. 1 is a cross section view of the device showing the valve operating piston at one end of its stroke.

FIG. 2 is an end view, partly in section.

FIG. 3 is a view of the grounding spring.

The device comprises a main housing 10 having a bore 11 therethrough forming a cylinder, the bore 11 constituting the internal wall of the cylinder. Mounted for reciprocation within the cylinder is a piston 12 having hollow end portions 13 and 14 connected by a central solid section 15.

The housing 10 has an inlet port 16 communicating with an annular passage 17 which surrounds and intersects the cylinder bore 11 and which connects with an enlarged opening 18 which leads to a flat surface 19 on the housing 10 diametrically opposite the inlet port 16. Clamped against the flat face 19 is a valve block 21 having a pair of exhaust ports 22 and 23 therein which are open at one end to the exterior of the valve block 21 and whose other ends are open to passages 24 and 25 respectively. The valve block also has a pair of delivery ports 26 and 27 whose lower ends are open to lower face 28 of the valve block and whose upper ends are connected by passages 29 and 30, respectively, to the upper face 31 of the block.

The valve block 21 may be attached by means of threaded studs 32 to a device, such as a reciprocating piston type motor, not shown, to be operated by fluid under pressure delivered thereto by ports 26 and 27 alternately.

Mounted in an annular groove 35 in the central portion of the piston 12 is a slide valve 36 having channels 37–38 in the lower face 39 thereof. A spring 40, assisted by fluid pressure within the valve chamber 18, maintains the lower face of the slide valve 36 in sealing relation with the upper face 31 of the valve block.

A pair of restricted orifices 44, 45 connect piston groove 35 with recesses 46 and 47 defined by the piston skirt portions 13 and 14. The piston recesses 46 and 47 are open to the respective ends of the cylinder bore 11.

The piston 12 also carries a pair of rubber valve elements 48 and 49 on opposite sides of the solid central portion 15.

The main housing 10 carries a pair of solenoid pilot valves generally designated 50 and 51. These solenoid valves are of identical construction and a description of one will serve as a description of the other, like reference numerals being used to indicate like parts in the drawing.

The solenoid valves each includes a solenoid housing comprising a cup shaped body 54 which projects into the cylinder bore 11 and is closed at its open end by a molded non-conducting plastic cap 55 which is firmly attached to the body 54 by suitable potting 53. The cap is attached to the main housing 10 by bolts 56. The body 54 is electrically grounded to main housing 10 by a spring ring 57 located in a groove within body 54 and frictionally engaging the bore 11. The spring ring is specially shaped, as shown in FIG. 3 with radial convolutions 58 therein for insuring tight frictional contact with both the solenoid housing body 54 and the main housing cylinder bore 11 so as to effectively serve as a ground connection between the two parts.

The solenoid housing body 54 contains a coil 60 having one lead 61 connected to a terminal post 62 and another lead 63 connected to a plate 64 mounted within and in electrical contact with body 54. The terminal plugs 62 are mounted directly in the caps 55. This permits removal of an entire solenoid pilot valve from the main housing 10 without disturbing the connection of the solenoid coils 60 with the plugs. Thus, removal of the bolts 56 permits the corresponding solenoid valve 50 or 51 to be removed from the housing 10 without removing the plug 62 from the cap 55 and without disconnecting the lead wires 61 or 63. The cap 55, being of non-conductive plastic, insulates the terminals 62 from the main housing 10 so that no additional insulator is required as would be the case if the cap 55 were made of metal.

Mounted within the coil 60 is a movable plunger 66 which serves as a valve element and is normally moved outwardly by a spring 67 into seating engagement with a valve seat member 68 for normally closing a port 69 through the seat member. The plunger 67 carries a rubber seat member 70 for making such seating engagement.

The solenoid valve 50 has an exhaust passage therethrough which includes an axial opening 72 through the bottom wall of the cup shaped solenoid housing 54, an axial bore 73 extending part way through the plunger 66, a valve chamber 74, a cross bore 75 through the plunger connecting the axial bore 73 with the valve chamber 74, and the port 69. The body 54 also has a valve seat 76 surrounding the opening 72 and engageable with the rubber valve element 49.

The cap 55 has an opening 77 in axial alignment with the plunger 66 and of larger diameter thereof. The seat member 68 is threaded into the opening 77 and is removable therefrom to permit removal of the valve plunger 66 through the opening 77 to permit ready replacement of the rubber valve element 70.

In operation, the mechanism herein disclosed may be attached by means of studs 32 to a reciprocating piston type fluid pressure motor with valve port 26 connected to a port leading to one side of the piston for such motor and with valve port 27 being connected to a port leading to the opposite side of such piston. The solenoid terminals 62 are then connected to a source of electrical energy, not shown, and a means, also not shown, is provided for alternately energizing solenoid valves 50 and 51.

Port 16 is then connected to a source of fluid under pressure, such as air, and the device is ready to operater.

Normally, at the beginning of operation, the piston 15 is at one end or the other of its stroke with the corresponding valve element 48 or 49 seated against the adjacent valve seat 76 of the solenoid housing body 54. Assume that the piston 15 is at the leftward end of its stroke, as viewed in FIG. 1, with the valve element 49 seated against the body 54 of the pilot valve 50. In this position, the slide valve 36 is positioned as shown with channel 37 connecting delivery port 27 with exhaust port 22 and with channel 38 covering only exhaust port 25 so that delivery port 26 is open to valve chamber 18 through passage 29. Pressure fluid thus flows from inlet port 16 through annular passage 17 to valve chamber 18 and through passage 29 and delivery port 26 to one side of the fluid pressure motor to be operated.

During this time, pressure fluid also passes through the restricted openings 44 and 45 into the recesses 46 and 47 of the piston 15. The pressure fluid within the recess 47 is trapped therein since valve element 49 is seated against the adjacent valve seat 76 on the solenoid valve housing body 54. Pressure fluid within recess 46 enters the exhaust passages 72, 73, 75 and valve chamber 74 of the solenoid valve 51 but is trapped therein since plunger 66 of solenoid valve 51 is seated against the corresponding seat member 68. At this time pressure fluid within the right hand end of cylinder bore 11 is acting leftwardly across the entire diametrical area of piston 15 while pressure fluid within recess 47 and the corresponding end of cylinder bore 11 is acting in the opposite direction against the same piston area less the area of valve seat 76. Thus there is differential pressure acting to hold the piston 15 in its leftward position against solenoid housing body 54.

Upon momentary energizing of solenoid valve 51, the plunger 66 therein will be retracted against pressure of the spring 67 to unseat the valve face 70 from the seat member 68 so as to open the corresponding exhaust port 69. Port 69, as well as the remaining portions of the exhaust passage through the solenoid valve 51 are of larger fluid carrying capacity than the bleed port 44 and hence pressure fluid can exhaust from recess 46 and the corresponding end of the cylinder bore 11 faster than it can enter through bleed port 44. This drops the fluid pressure acting on the corresponding side of piston 15 so that the pressure of the fluid acting on the opposite side of the piston in recess 47 and the corresponding cylinder becomes dominant and moves the piston 15 to the right until valve element 48 engages seat 76 of pilot valve 51 to close the exhaust passages through pilot valve 51.

Closing of the exhaust passages by valve element 48 prevents further escape and unnecessary loss of pressure fluid through such exhaust passages during such time that plunger 66 remains unseated from seat member 68.

Upon shifting of the piston 15 to the right, as just described, the piston carries with it slide valve 36. When the piston reaches the rightward end of its stroke, channel 38 connects passage 31 with exhaust port 25 and channel 37 has moved to the right so as to cover only exhaust passage 24 and passage 30 is connected with valve chamber 18 so that pressure fluid from valve chamber 18 will be delivered to port 27 and to the corresponding side of the fluid pressure motor being operated. Solenoid valve 51 is then de-energized to permit the corresponding valve plunger 66 to seat against the adjacent seat member 68 for closing exhaust passage 69 therein.

Upon energizing solenoid valve 50, the acting is reversed for effecting movement of the piston 15 to the left. As solenoid valve 50 is energized, the corresponding plunger 66 is retracted to unseat the same from the adjacent seat member 68 thus opening the exhaust port 69 therein. Since this port, and the remaining portions of the exhaust passage through solenoid valve 50 are likewise of larger fluid carrying capacity than bleed port 45, pressure fluid will be exhausted from recess 47 and the corresponding end of the cylinder bore 11 faster than it can enter through the bleed port 45 creating a pressure unbalance upon the piston 15 effective to move the same to the left to the position shown in FIG. 1. In this position the valve element 49 on the piston 15 again closes the exhaust passage through pilot valve 50 by seating against seat member 76 on the solenoid housing body 54 to prevent further escape of pressure fluid from recesses 47 in the event solenoid 50 remains energized so as to retain valve plunger 66 in open position.

The mechanism is capable of very rapid operation, that is reciprocation of the piston 15 can be effected at a very rapid rate. To effect such reciprocation, the solenoid valves 50 and 51 are alternately energized and de-energized as rapidly as desired. Energizing may be highly momentary so as to be cut off before the piston reaches the corresponding end of its stroke since it will be carried the rest of the way by inertia and by unbalanced fluid pressure acting thereon since there is a small delay before pressure builds up in the exhausted end of the cylinder due to the restricted passage of pressure fluid there into through the respective orifice 44 or 45. By providing a piston, 15, which is hollow at both ends, the mass and hence inertia of the piston, can be kept to a minimum while at the same time the skirt portions 13 and 14 provide ample guide surface within the cylinder bore 11. It is desirable to keep the piston mass and its inertia to a minimum in order to facilitate the rapid operation and long life of the parts. Compactness of the entire mechanism is further accomplished by mounting the solenoid valves 50 and 51 in axial alignment with the piston 15 with solenoid housing bodies 54 projecting into the cylinder bore 11 and the piston recesses 46 and 47.

Compactness and ease of manufacture is further facilitated by forming the exhaust passages through the pilot valves in axial alignment therewith and with the piston and cylinder bore 11. The flow of fluid through such axial passages avoids any radial unbalance on the valve plungers and thus contributes to their ease of operation and long life.

Terminals 62 project from cap 55 in a radial direction with respect to the longitudinal axis of solenoid body 54. Screws 56 are symmetrically located so as to permit cap 55 to be mounted in any of four angular positions 90° apart. Thus by selectively mounting cap 55 in any of its four rotative positions, terminal 62 will likewise project in a selected one of four radial directions. This choice in direction for terminal 62 facilitates the connecting of an electrical conductor thereto in close quarter installations.

Speed control for the piston of the fluid pressure motor being actuated by the mechanism is accomplished by means of valves 80 and 81 threadedly mounted in valve block 21 for adjustably restricting the exhausting of fluid from the motor being operated through the respective exhaust ports 22 and 23.

Although one embodiment of the invention has been shown and described, it is obvious that various changes in the detailed construction can be made without departing from the scope of the invention as defined by the claims.

We claim:

1. A solenoid unit for mounting in the main housing of a device to be controlled by the solenoid unit, comprising a solenoid housing body insertible within said main housing, a solenoid within said body, a cap of non-conducting material attached to said body and to said main housing, and a terminal for said solenoid mounted in said cap, said cap, terminal, and body being removable from said main housing as a unit.

2. A solenoid unit in accordance with claim 1 in which said cap is permanently attached to said body.

3. A solenoid unit in accordance with claim 1 in which said body carries a yieldable member which when said body is inserted in said main housing contacts both said body and said main housing for establishing a ground connection therebetween.

4. A solenoid unit in accordance with claim 3 in which said yieldable member comprises a split ring.

5. A solenoid unit in accordance with claim 3 in which said yieldable member comprises a spring ring and one of said body and main housing has a groove in which said ring is carried.

6. A solenoid unit in accordance with claim 3 in which said housing has a bore, said body has a part adapted to be guided in said bore, and said yieldable member comprises a split ring for engaging the wall of said bore.

7. A solenoid unit in accordance with claim 3 in which said housing has a bore, said body has a part receivable within said bore, said part having a groove therein opening toward said bore when said part is within said bore, and said yieldable member comprises a split ring retained in said groove and making contact with the wall of said bore.

8. A solenoid unit in accordance with claim 1 in which said terminal projects radially from said cap and said cap is mountable on said housing in selective angular positions about the longitudinal axis of said body so as to position said terminals in a desired radial direction to facilitate the connecting of electrical conductors thereto.

9. A solenoid unit for mounting in the main housing of a device to be controlled by the solenoid unit comprising a solenoid housing body having a solenoid therein, a cap attached to said body for closing the same, means for attaching said cap to said main housing, and a terminal for said solenoid mounted in said cap, said cap being of non-conductive material and electrically isolating said terminal from said body and from said main housing.

References Cited in the file of this patent

UNITED STATES PATENTS

| | | |
|---|---|---|
| 2,318,136 | Alfrey | May 4, 1943 |
| 2,409,517 | Schmit | Oct. 15, 1946 |
| 2,417,990 | Nardone | Mar. 25, 1947 |
| 2,444,198 | Hasselhorn | June 29, 1948 |
| 2,460,908 | Scott | Feb. 8, 1949 |
| 2,616,449 | Maha | Nov. 4, 1952 |
| 2,719,939 | Ray | Oct. 4, 1955 |
| 2,850,685 | Ray | Sept. 2, 1958 |